United States Patent
Erikawa (12)  
(10) Patent No.: US 6,378,728 B1  
(45) Date of Patent: Apr. 30, 2002

(54) CUP FEEDING APPARATUS

(75) Inventor: Hajime Erikawa, Saitama-ken (JP)

(73) Assignee: Sanyo Electric Co., Ltd., Osaka-Fu (JP)

( * ) Notice: Subject to any disclaimer, the term of this patent is extended or adjusted under 35 U.S.C. 154(b) by 0 days.

(21) Appl. No.: 09/672,905

(22) Filed: Sep. 29, 2000

(30) Foreign Application Priority Data

Sep. 29, 1999 (JP) .............................................. 11-276770

(51) Int. Cl.⁷ ............................................... B65G 59/00

(52) U.S. Cl. ....................................... 221/123; 221/222

(58) Field of Search ........................... 221/92, 103, 123, 221/93, 124, 131, 221, 222, 231, 297

(56) References Cited

U.S. PATENT DOCUMENTS 3,807,600 A * 4/1974 Mass et al. .................. 221/222  
4,854,479 A * 8/1989 Callahan et al. ............. 221/304

* cited by examiner

*Primary Examiner*—Kenneth W. Noland  
(74) *Attorney, Agent, or Firm*—McDermott, Will & Emery (57) ABSTRACT

The operation of selecting one cup delivery section from a plurality of cup delivery sections is performed based on the rotation of a barrel in one direction. On the other hand, the operation of driving the selected one cup delivery section to feed a cup is selectively performed based on the rotation of the barrel in another direction. Thus, a cup feeding apparatus can be provided which can feed various cups without providing a plurality of drive sources and can realize excellent working efficiency of the assembly and the maintenance and inspection without increasing the apparatus cost.

4 Claims, 10 Drawing Sheets

CUP FEEDING APPARATUS

FIELD OF THE INVENTION

The invention relates to a cup feeding apparatus, and more particularly to a cup feeing apparatus for feeding a cup based on the rotation torque of a motor.

BACKGROUND OF THE INVENTION

In conventional cup-type vending machines, cups for receiving a beverage are stacked on one another and stored in a cup storing section. Upon the receipt of a request for selling, one cup is separated from the stacked cups and fed to a cup stage.

In recent years, the diversification of cup-type beverages has been advanced and has led to the appearance of a cup-type vending machine which can selectively feed a cup of size S, M, or L according to the selected type of cup-type beverage. In this cup-type vending machine, a mechanism for separating cups is provided for each of the cup sizes, and, upon the receipt of a request for selling, the cup separating mechanism corresponding to the selected beverage is driven, and separates and feeds one cup from the stacked cups.

Figure 10A:
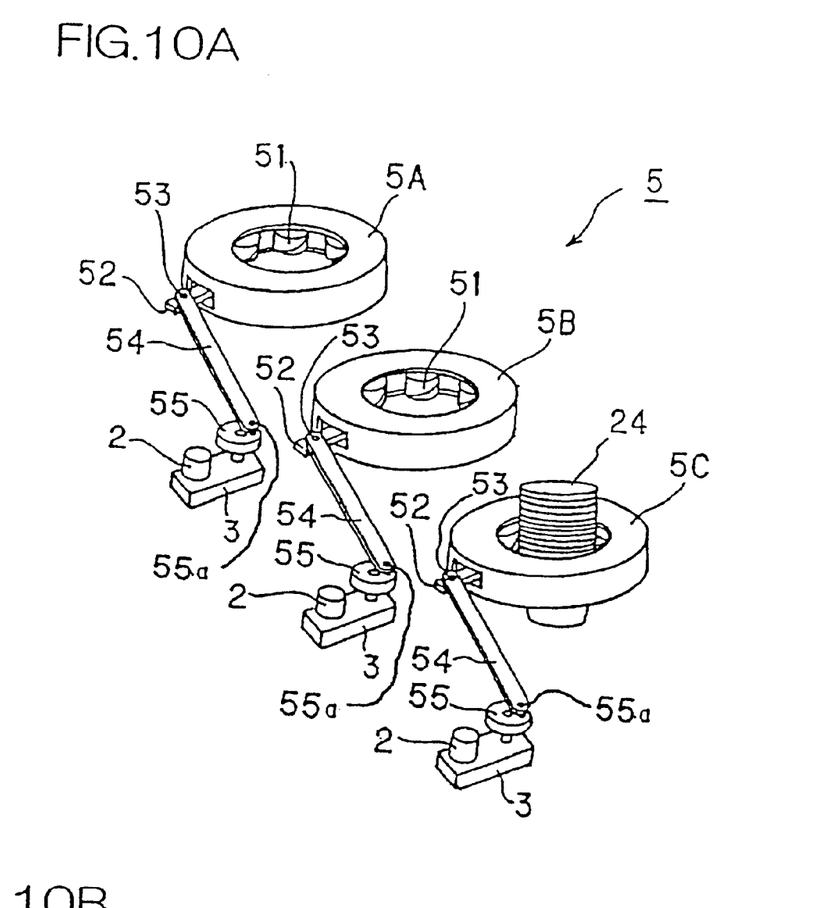
FIG. 10A is a perspective view of a conventional cup feeder.

FIG. 10A shows a cup feeder 5 in a conventional cup-type vending machine. The cup feeder 5 comprises: cup delivery sections 5A, 5B, 5C which are provided according to cup sizes (S, M, L) and function to deliver a cup 24 based on the operation of rotation of a barrel 51 having on its periphery spiral grooves; a lever 52 integrally mounted on a ring (described later) which rotatively drives the barrel 51; a drive motor 2 which is rotated at the time of cup delivery operation; a torque transmission section 3 for transmitting the torque of the drive motor 2 to a rotating member 55; and a connecting member 54 for connecting the lever 52 to the rotating member 55 through a pin 53. As soon as the drive motor 2 is driven, the rotational motion created in the rotating member 55 is converted to reciprocating motion by an eccentrically rotating section 55a, and is transmitted to the lever 52.

Figure 10B:
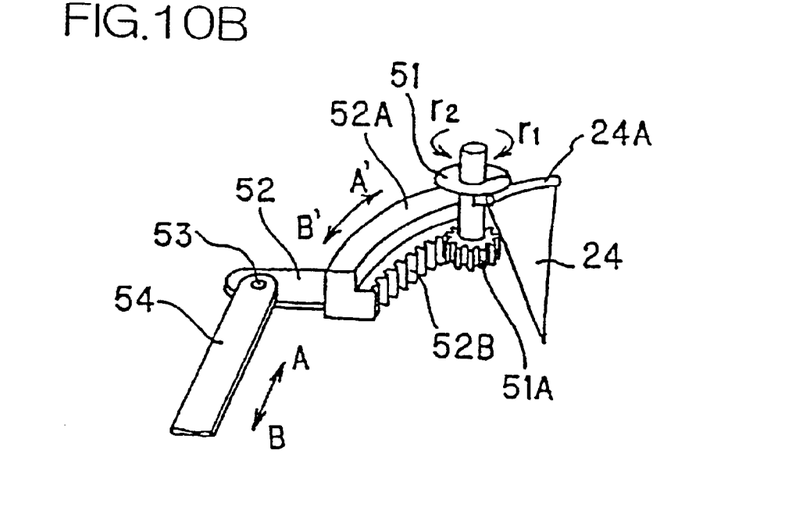
FIG. 10B is a partial explanatory view of the drive mechanism of the cup feeder.

FIG. 10B shows the barrel 51. As soon as the connecting member 54 connected through the pin 53 to the lever 52 integrally mounted on the ring 52A is displaced in a direction A, the ring 52A is rotated in a direction A'. The ring 52A has, in its internal circumference, a gear 52B engaged with a gear 51A mounted on a rotating shaft of the barrel 51. Upon the rotation of the ring 52A in the direction A', the barrel 51 is rotated in a direction $r_1$. As soon as the connecting member 54 is displaced in a direction B, the ring 52A is rotated in a direction B' to rotate the barrel 51 in a direction $r_2$. The rotation of the barrel 51 in the direction $r_1$ permits an edge 24A of the lowermost cup 24 to be held in a spiral groove, and, upon the rotation of the barrel 51 in the direction $r_2$, the edge 24A is sent to the downward side of the barrel 51 in the paper. Consequently, the lowermost one cup is separated from the stacked cups 24, and is delivered downward.

The conventional cup feeding apparatus, however, needs to provide motors, wirings, and drive circuits, the number of which corresponds to the number of cup delivery sections mounted. This disadvantageously increases the apparatus cost, and, in addition, deteriorates the working efficiency of the assembly and the maintenance and inspection.

SUMMARY OF THE INVENTION

Accordingly, it is an object of the invention to provide a cup feeding apparatus which can feed various cups without providing a plurality of drive sources and can realize excellent working efficiency of assembly and maintenance and inspection without increasing the apparatus cost.

According to the first feature of the invention, there is provided a cup feeding apparatus for feeding a cup from one cup feeder selected, according to a beverage to be sold, from a plurality of cup feeders respectively for a plurality of cup sizes, within a cup-type vending machine, said cup feeders for respective cup sizes each storing therein a plurality of corresponding cups stacked on top of one another, said cup feeding apparatus comprising:

a first rotating member which is rotated in a first or second rotation direction based on the rotation of a motor;

a second rotating member provided coaxially with the first rotating member;

a one-way clutch which, when the first rotating member is rotated in the first rotation direction, releases coupling between the first rotating member and the second rotating member, and, when the first rotating member is rotated in the second rotation direction, couples the first rotating member with the second rotating member;

a displacement mechanism for displacing the second rotating member in the axial direction according to the quantity of rotation of the first rotating member in the first rotation direction; and a plurality of operating members which are provided so as to correspond to the plurality of cup feeders and, upon receipt of an external operation command, permits the plurality of cup feeders to perform cup feed operation, said second rotating member being constructed so that the second rotating member is displaced to a position in the axial direction corresponding to a size selected from the plurality of sizes to directly or indirectly engage with one operating member selected from the plurality of operating members, thereby issuing the operation command to the one operating member.

According to the above cup feeding apparatus, two operations, the selection of an object to be driven and the transmission of driving force, are selectively executed by the second rotating member based on the rotation direction of the first rotating member.

BRIEF DESCRIPTION OF THE DRAWINGS

The invention will be explained in more detail in conjunction with appended drawings, wherein.

DESCRIPTION OF THE PREFERRED EMBODIMENTS

Preferred embodiments of the cup feeding apparatus according to the invention will be described in more detail in conjunction with the accompanying drawings.

Figure 1A:
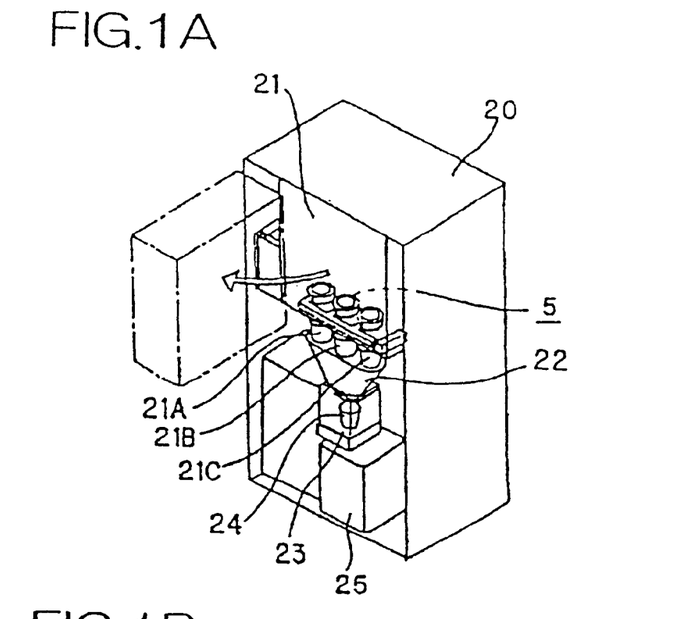
FIG. 1A is an explanatory view of a cup-type vending machine according to a preferred embodiment of the invention

FIG. 1A shows a cup-type vending machine according to a preferred embodiment of the invention. The cup-type vending machine comprises: a cup feeder 21 housed in the upper part of the inside of a body 20; cup drop ports 21A, 21B, 21C corresponding to cup sizes S, M, and L and provided at the bottom of the cup feeder 21; cup feeders 5 which are provided so as to correspond respectively to the cup drop ports 21A, 21B, 21C, contain, in a cup feeder 21, a plurality of cups stacked on each other or one another respectively for cup sizes S, M, and L, and, upon the receipt of a request for selling, permit a selected one of the cup feeders to separate and feed one cup to, among the cup drop ports 21A, 21B, 21C, a cup drop port corresponding to the selected cup feeder; a cup chute 22 which is rectangularly provided so as to correspond to the cup drop ports 21A, 21B, 21C and is in a flat hopper form as a whole; a cup stage 23 on which the cup 24 fed through the cup chute 22 is placed; and a drainage bucket 25 provided at the bottom of the cup stage 23, for receiving a beverage, for example, spilled from the cup 24.

Figure 1B:
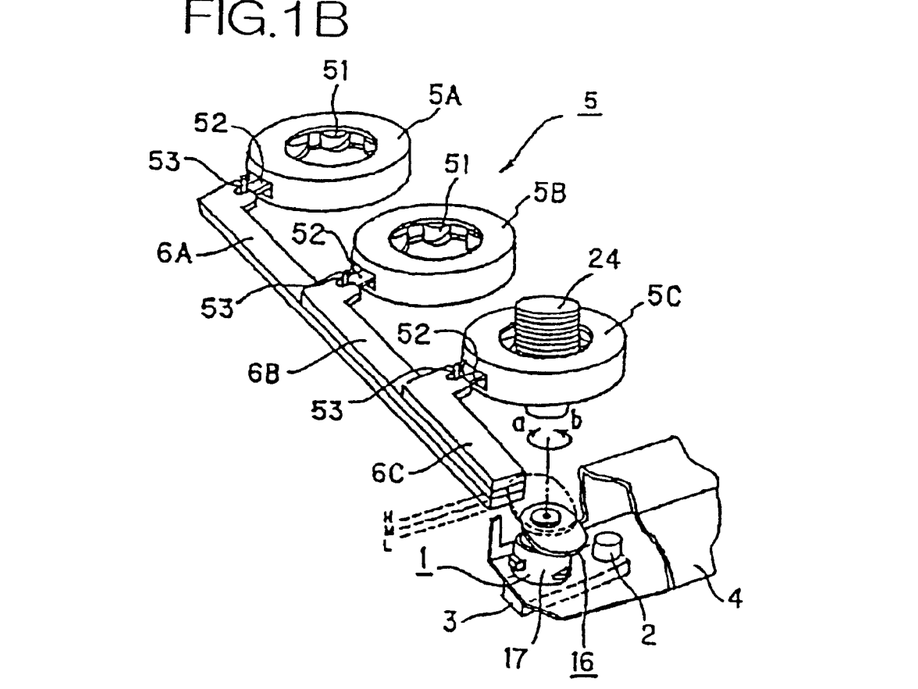
FIG. 1B is a perspective view of a cup feeding section according to a first preferred embodiment of the invention.

FIG. 1B shows cup feeders 5 according to a first preferred embodiment of the invention which are provided so as to correspond respectively to cup sizes (S, M, L) and comprise: cup delivery sections 5A (cup size L), 5B (cup size M), and 5C (cup size S) which deliver a cup 24 based on the rotation of a barrel 51 having a spiral groove on its periphery; a lever 52 integrally mounted on a ring (not shown) which rotates the barrel 51; a cam drive 1 that has a barrel 17 rotated by transmitting, through a torque transmitting section 3, a rotational torque created in a drive motor 2 and a barrel 16 which is vertically displaced based on the rotation of the barrel 17 in a direction a and, together with the barrel 17, is rotated based on the rotation of the barrel 17 in a direction b; a frame 4 which integrally houses therein the drive motor 2, the torque transmitting section 3, the barrel 16, and the barrel 17; and sliders 6A, 6B, and 6C which are reciprocated based on the rotation of the barrel 16 to drive the pin 53 fixed on the lever 52 of the cup delivery sections 5A, 5B, 5C, comprise plate members stacked on one another, and are energized toward the barrel 16 by a spring (not shown). The drive motor 2 is a direct-current motor, and is rotated in a predetermined direction by switching the energization polarity.

Figure 2A:
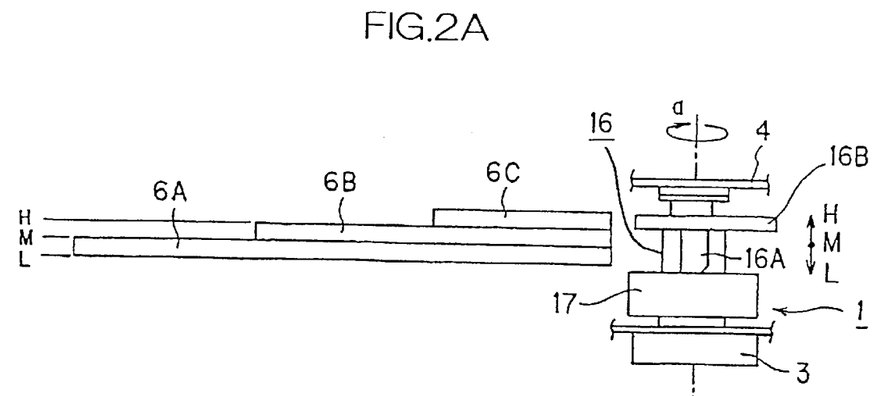
FIG. 2A is a side view showing a drive position selecting operation of a cam drive.

FIG. 2A shows the drive position selecting operation of the cam drive 1. Upon the rotation of the barrel 17 in the direction a, the barrel 16 is displaced, in a non-driven state, in a vertical direction in the order of L, M, and H based on the rotational torque transmitted through the torque transmitting section 3, and descends from position H to position L. In the drawing, the barrel 16 is located at position H.

Figure 2B:
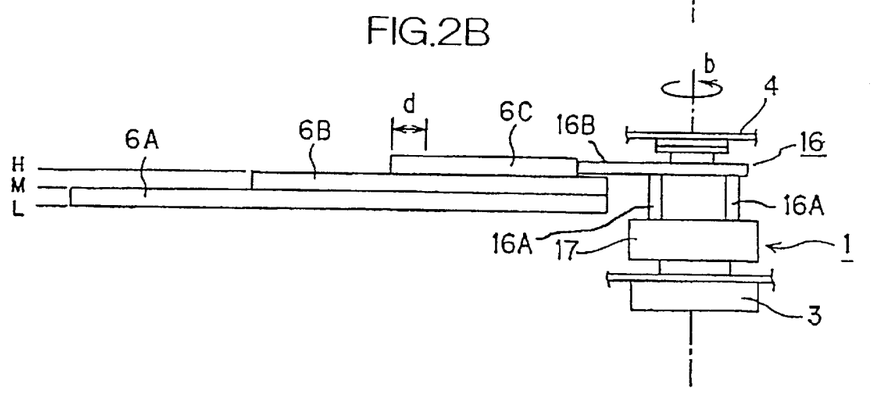
FIG. 2B is a side view showing a cup feeding operation of the cam drive.

FIG. 2B shows the cup feeding operation of the cam drive 1. Upon the rotation of the barrel 17 in the direction b, the barrel 16 is rotated based on the rotational torque transmitted through the torque transmitting section 3. In the drawing, as soon as the barrel 16 depresses the slider 6C at the position H, the movement on a level d corresponding to the level of the eccentricity of the barrel 16 is provided.

Figure 3:
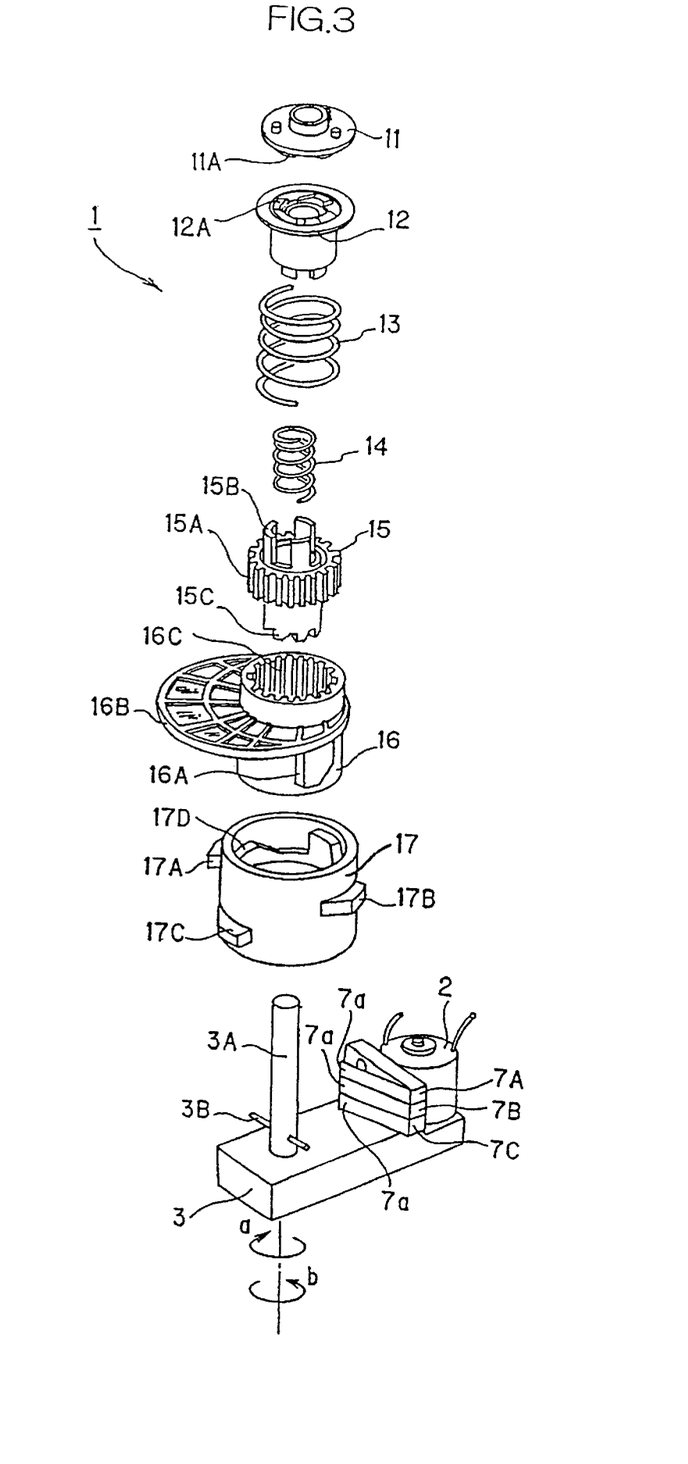
FIG. 3 is an exploded view of a cam drive according to a first preferred embodiment of the invention.

FIG. 3 is an exploded view of the cam drive 1. The cam drive 1 comprises: a stopper 11 which is fixed to a frame 4 (not shown) and has, at its lower part, annular serrate engagement projections (hereinafter referred to as "engagement projections") 11A comprising a vertical face and an inclined face; a barrel 12 having engagement projections 12A which engage with the engagement projections 11A of the stopper 11; a barrel 15 which has comb's teeth-like annular projections 15B which engage with a spline 15A provided in the periphery and comb's teeth-like annular projections 12B (described below) provided on the barrel 12, and engagement projections 15C annularly provided at the lower part; a spring 14 is held and sandwiched between the barrel 12 and the barrel 15; a barrel 16 comprising a projection 16A, a cam 16B, and a spline 16C; a spring 13 which is mounted between the barrel 12 and the barrel 16 to energize the barrel 16 downward; a barrel 17 for housing therein the barrel 16, comprising projections 17A, 17B, 17C for switching operation, provided in its periphery respectively at predetermined positions, and a projection 17D which is provided in the internal circumference and engages with the projection 16A in the barrel 16; a rotating shaft 3A which engages with the barrel 17 through an engagement pin 3B and transmits the rotational torque based on the rotation of the drive motor 2 to the barrel 17 to rotate the barrel 17; and switches 7A, 7B, 7C that, when operated by a switch plate 7a which comes into contact with the projections 17A, 17B, 17C provided on the barrel 17, generates a current stop signal.

Figure 4:
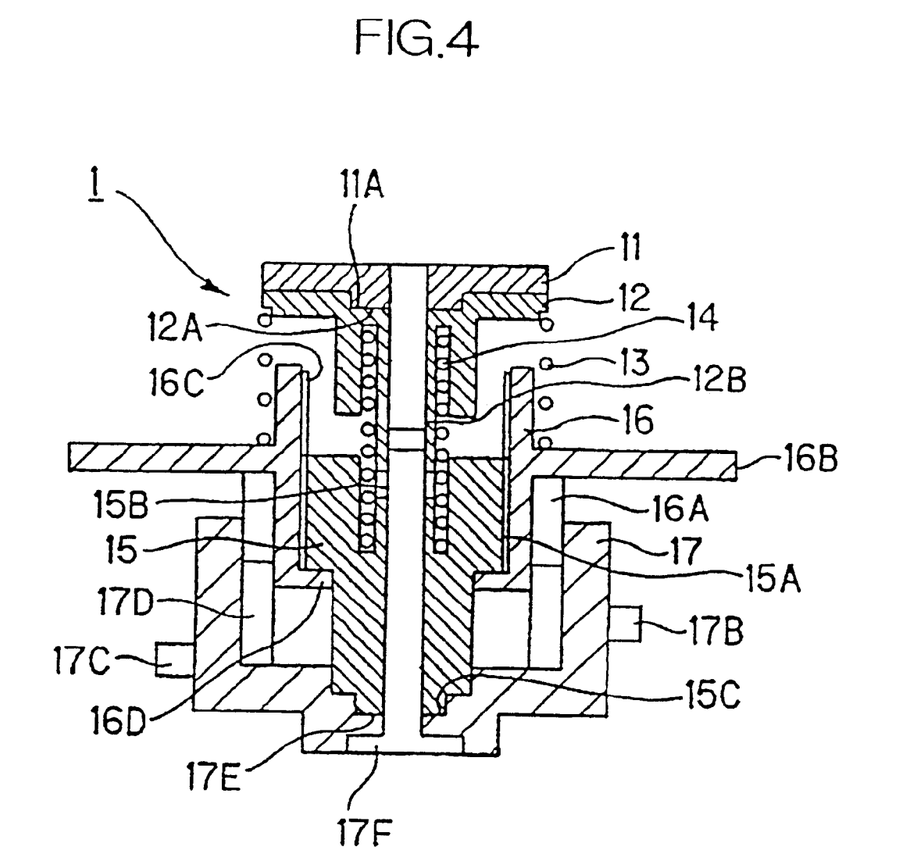
FIG. 4 is a cross-sectional view of the cam drive according to the first preferred embodiment of the invention.

FIG. 4 shows the vertical section of the cam drive 1. In this drawing, the frame 4, the torque transmitting section 3, the rotating shaft 3A, and the engagement pin 3B are not shown for simplifying the explanation. In the barrel 15, the engagement projection 15C provided at its bottom engages with the engagement projection 17E provided within the barrel 17 to form a one-way clutch which is brought to a coupled state (which transmits rotational torque) or an uncoupled state (which does not transmit rotational torque) based on the rotation direction of the barrel 17. Further, in the barrel 15, the displacement in a vertical direction is permitted at the time of uncoupling operation between the barrel 15 and the barrel 17 based on the engagement of the comb's teeth-like annular projections 15B with the comb's teeth annular projections 12B provided on the barrel 12. The barrel 16, when energized downward by the spring 13 mounted between the barrel 16 and the barrel 12, brings the projection 16A into close contact with the projection 17D provided in the internal circumference of the barrel 17 to position the cam 16B at a predetermined height in the vertical direction. Further, the barrel 16 has a stopper 16D at its lower part to prevent the barrel 15, which slides along the spline 16C, from coming off from the lower part.

Figure 5:
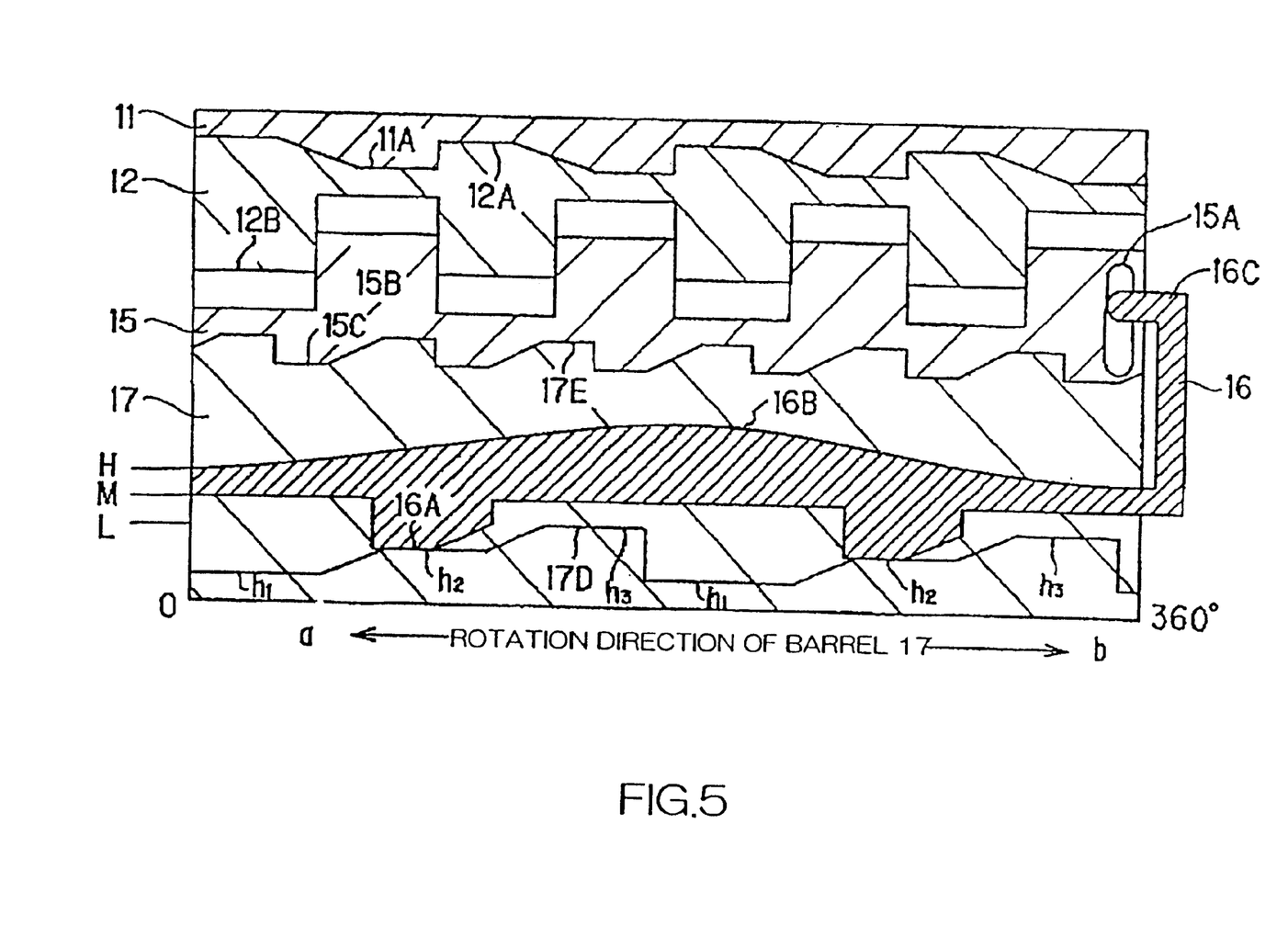
FIG. 5 is a diagram illustrating the state of coupling of each section of the cam drive according to the first preferred embodiment of the invention.

FIG. 5 is a diagram illustrating the state of engagement in each section of the cam drive 1, shown in the state of development at 360 degrees in the circumferential direction, wherein the cam 16B in the barrel 16 is located at position M. The projections 17D have three levels of height, $h_1$, $h_2$, $h_3$, and the projection 16A in the barrel 16 is positioned at height $h_2$ of the projection 17D. The number of steps of the projection 17D may be increased or decreased according to need.

Upon the rotation of the barrel 17 in the direction a, coupling between the barrel 17 and the barrel 15 is released, while the barrel 12 is coupled with the stopper 11, whereby the barrel 16 is not rotated and is displaced in the vertical direction. Upon the rotation of the barrel 17 from the position shown in the drawing toward the direction a, the barrel 16 is positioned at height $h_3$ of the projection 17D. Further rotation brings the barrel to height $h_1$.

Upon the rotation of the barrel 17 in the direction b, the barrel 17 is coupled with the barrel 15, while coupling between the barrel 12 and the stopper 11 is released. In this case, the rotational torque is transmitted from the barrel 17 to the barrel 15, and the rotational torque is transmitted from the spline 15A in the barrel 15 to the barrel 16 through the spline 16C in the barrel 16, whereby the barrel 16, together with the barrel 17, is rotated.

Figure 6:
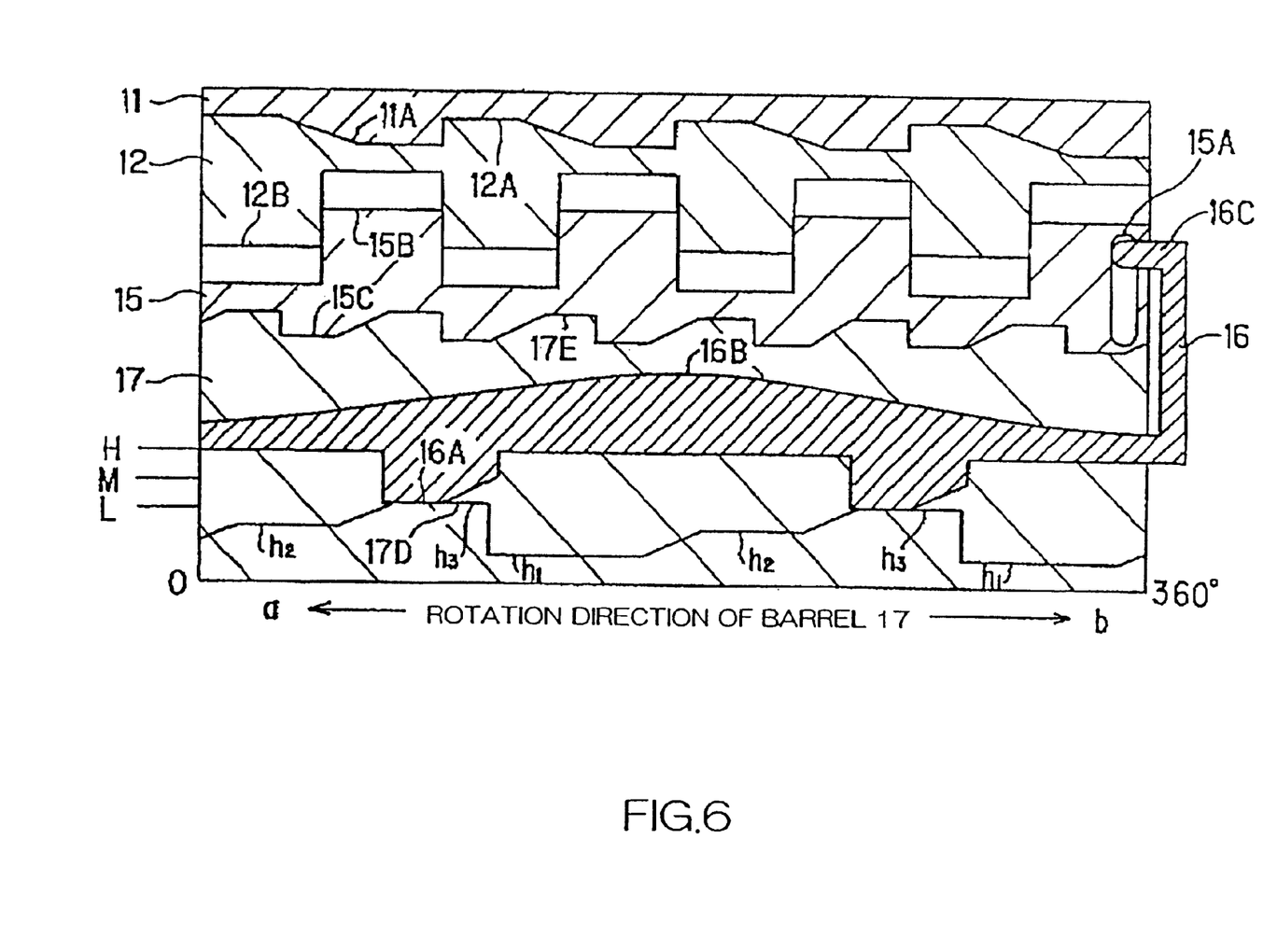
FIG. 6 is a diagram illustrating the state of coupling of each section of the cam drive according to the first preferred embodiment of the invention.

FIG. 6 shows such a state that the projection 16A in-the barrel 16 is positioned at height $h_3$ of the projection 17D, thereby permitting the cam 16B in the barrel 16 to be placed at position H.

Figure 7:
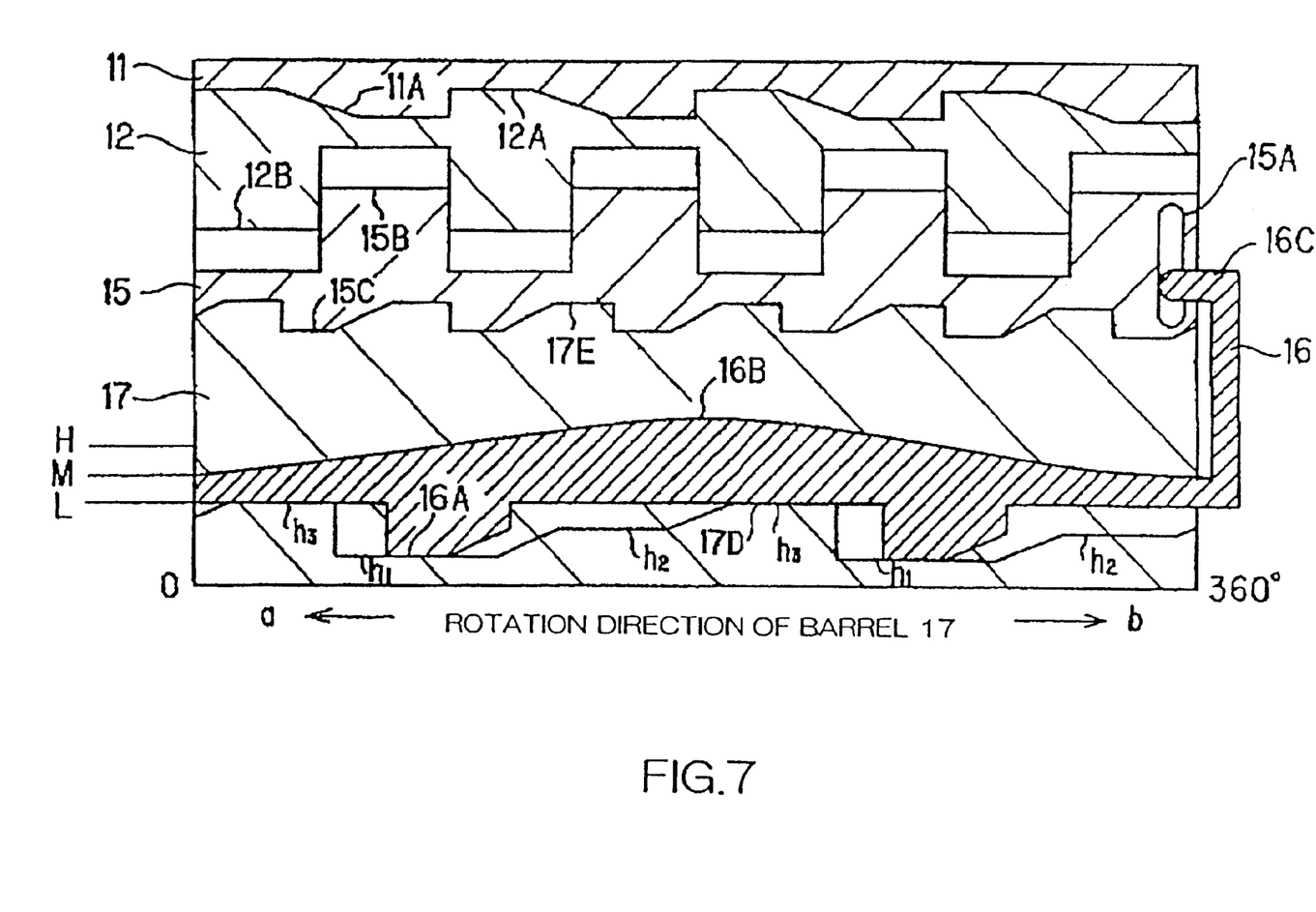
FIG. 7 is a diagram illustrating the state of coupling of each section of the cam drive according to the first preferred embodiment of the invention.

FIG. 7 shows such a state that the projection 16A in the barrel 16 is positioned at height $h_{31}$, of the projection 17D, thereby permitting the cam 16B in the barrel 16 to be placed at position L.

Figure 8:
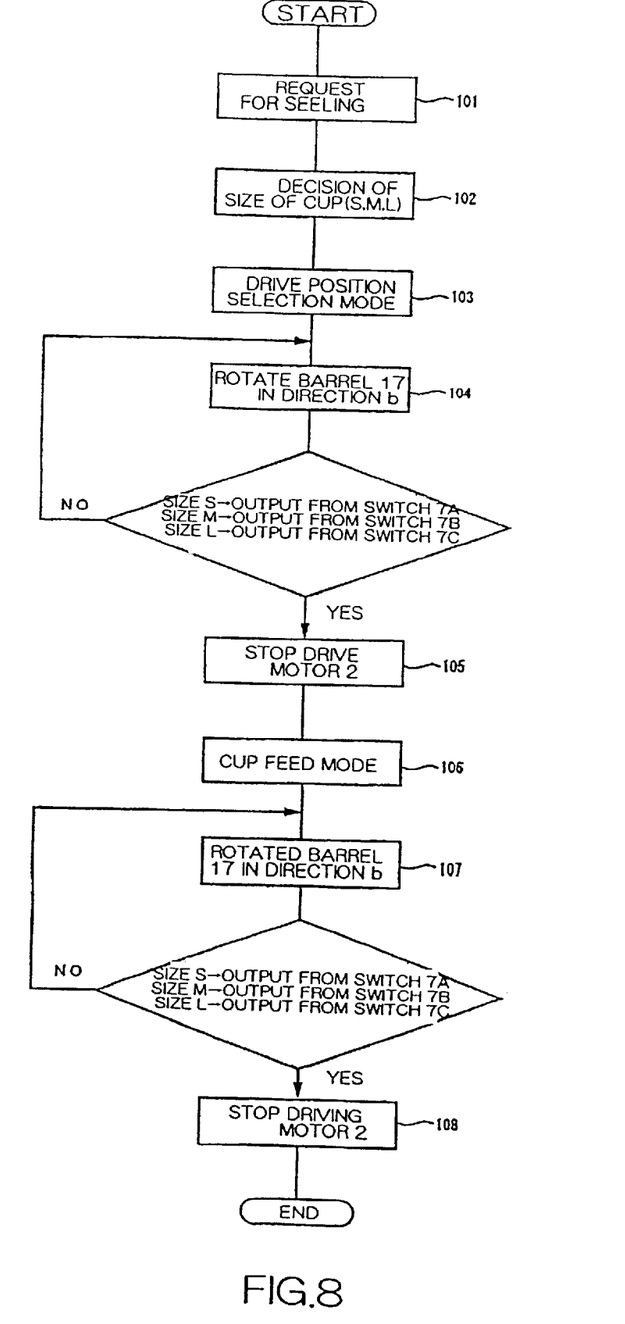
FIG. 8 is a flow chart showing the cup delivery operation of the cup-type vending machine according to a first preferred embodiment of the invention.

FIG. 8 is a flow chart on cup delivery operation in a cup-type vending machine provided with the above cup feeding apparatus. The operation of the cup feeding apparatus will be explained in conjunction with the drawing.

As soon as a purchaser depresses a selling button for a cup-type beverage provided in a vending machine, a selling request signal corresponding to the selected cup-type beverage is output to a selling control unit (not shown) (101). The selling control unit decides the size of a cup corresponding to a cup-type beverage based on the selling request signal (102), and executes a drive position selection mode (103). Here when a cup of size S has been selected, the drive motor 2 in the cam drive 1 is energized to rotate the barrel 17 in the direction a (104). Upon the rotation of the barrel 17 in the direction a, the barrel 16 is vertically displaced to place the cam 16B in the barrel 16 at position H where the slider 6C is disposed. As soon as the cam 16B is placed at a predetermined height, the projection 17A provided in the barrel 17 comes into contact with the switch plate 7a, whereby the switch 7A is turned ON. Consequently, a current stop signal is output to stop the supply of a current to the drive motor 2 (105). As soon as the barrel 16 is placed at a predetermined height, the selling control unit executes a cup feed mode (106). In the cup feed mode, one cup of a selected size contained in a corresponding cup feeder among the cup feeders corresponding respectively to cup sizes is separated from the stacked cups in the cup delivery section and fed. In delivery operation of a cup 24 of size S, the drive motor 2 in the cam drive 1 is energized to rotate the barrel 17 in the direction b (107). Upon the rotation of the barrel 17 in the direction b, the barrel 16 is rotated at position H where the slider 6C is disposed, and the cam 16B depresses the slider 6C to drive the pin 53 fixed onto the lever 52 in the cup delivery section 5C. As a result, the cup 24 is delivered at the cup delivery section 5C. As soon as the barrel 16 is rotated by one turn, the projection 17A provided on the barrel 17 comes into contact with the switch plate 7a, whereby the switch 7A is turned ON. Consequently, a current stop signal is output to stop the supply of a current to the drive motor 2 (108).

Figure 9:
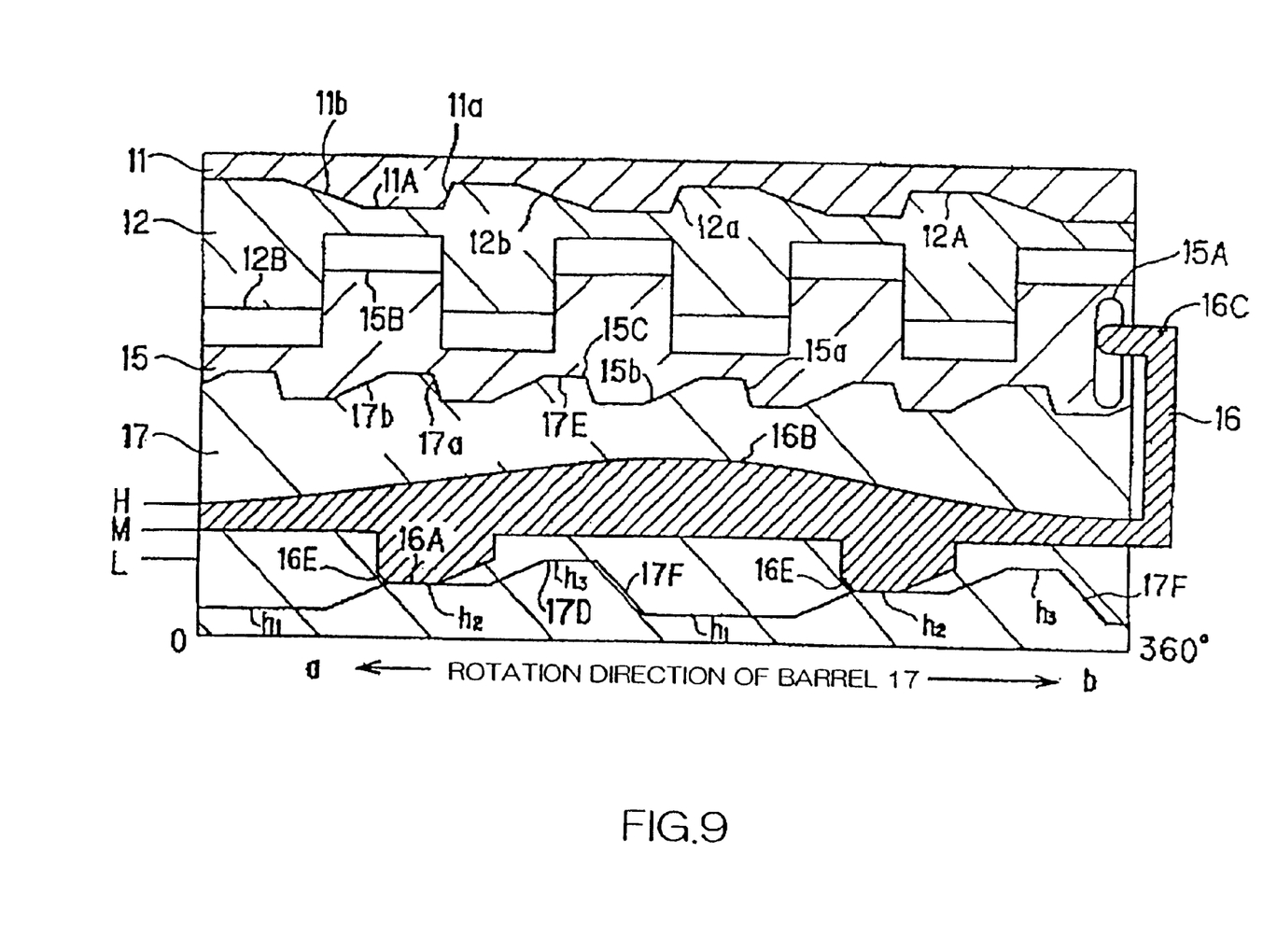
FIG. 9 is an explanatory view of other construction of the cam drive according to the first preferred embodiment of the invention.

FIG. 9 shows other construction of the cam drive 1. For simplification of the explanation, the state of engagement of each section in the cam drive 1 is shown in the state of development at 360 degrees in the circumferential direction. The cam drive comprises an inclined face 11a provided on the engagement projections 11A in the stopper 11 described above in connection with FIG. 3, and an inclined face 11b provided at a lower angle of inclination than the inclined face 11a. The inclined faces 11a, 11b are formed so as to engage with the inclined faces 12a, 12b, having the same shapes as the inclined faces 11a, 11b, provided on the engagement projection 12A in the barrel 12. When the barrel 12 is rotated in an uncoupled state, face or linear contact with the stopper 11 can prevent the occurrence of sound of impact.

The inclined faces 15a and 15b provided on the engagement projection 15C in the barrel 15 and the inclined faces 17a and 17b formed on the engagement projection 17E in the barrel 17 also have the same shape, and are formed so as to suppress the occurrence of sound of impact during rotation. The barrel 16 has a chamfer 16E on its projection 16A, and the barrel 17 has a chamfer 17F on its projection 17D.

In the drive position selection mode, when the barrel 17 is rotated in the direction a and the projection 16A in the it barrel 16 descends from position $h_3$ to position $h_1$, of the projection 17D, this cam drive 1 descends along the chamfer 17F to reduce an impact created at the time of the descent of the barrel 16, thereby suppressing the occurrence of sound of impact. Further, the provision of the chamfer 16E on the projection 16A can reduce the surface pressure applied to the chamfer 17F, thereby suppressing abrasion.

According to the above cup feeding apparatus, the operation of selecting one cup delivery section from a plurality of cup delivery sections and the operation of driving the one selected cup delivery section are selectively performed based on the first and second rotation directions of the drive motor 2. This enables a plurality of cup delivery sections 5A, 5B, 5C to be driven by a single drive motor 2, and thus can reduce the number of parts in the drive system to lower the apparatus cost. Further, this can eliminate the need to provide a space necessary for the installation of drive motors. Moreover, sliders 6A, 6B, 6C comprising plate members stacked on one another can realize space saving. A reduction in the number of parts can improve the working efficiency of the assembly and the maintenance and inspection. In the above cup-type vending machine, the cam 16B is provided on the barrel 16 to convert rotation motion to reciprocation motion based on the level of eccentricity of the cam. Alternatively, for example, a construction may be adopted wherein a gear is provided instead of the cam and is engaged with the gear on the drive side to transmit the drive force.

Further, a construction may be adopted wherein a chamfer 16E is provided on the projection 16A in the barrel 16 and, when the barrel 16 descends from position H to position L, the barrel 16 is allowed to descend along the chamfer 17E provided on the projection 17D while sliding, whereby collision between the projection 16A and the projection 17D can be prevented at the time of descent of the barrel to reduce the occurrence of noise.

In the preferred embodiments of the invention, the cup delivery section provided in the cup storing section of a cup-type vending machine and the construction for driving the cup moving mechanism have been explained. The invention may be applied to a selling mechanism in a can rack for storing can beverages, such as canned beer and canned soft drinks, and a selling mechanism in a product storing section for storing box products, such as cigarettes. In this case, a plurality of selling mechanisms can be selectively driven by a single motor. This can reduce the number of parts necessary for the selling mechanism, and thus can form the drive system in a compact form at a low cost.

As described above, the cup feeding apparatus according to the invention comprises: a first rotating member which is rotated in a first or second rotation direction based on the rotation of a motor; a second rotating member provided coaxially with the first rotating member; a one-way clutch which, when the first rotating member is rotated in the first rotation direction, releases coupling between the first rotating member and the second rotating member while, when the first rotating member is rotated in the second rotation direction, couples the first rotating member with the second rotating member; a displacement mechanism for displacing the second rotating member in the axial direction according to the quantity of rotation of the first rotating member in the first rotation direction; and a plurality of operating members which are provided so as to correspond to the plurality of cup feeders and, upon receipt of an external operation command, permit the plurality of cup feeders to perform cup feed operation, the second rotating member being constructed so that the second rotating member is displaced to a position in the axial direction corresponding to a size selected from the plurality of sizes to directly or indirectly engage with one operating member selected from the plurality of operating members, thereby issuing the operation command to the one operating member. By virtue of this constitution, various cups can be fed without providing a plurality of drive sources, and the working efficiency of the assembly and the maintenance and inspection without increasing the apparatus cost can be enhanced.

The invention has been described in detail with particular reference to preferred embodiments, but it will be understood that variations and modifications can be effected within the scope of the invention as set forth in the appended claims.

What is claimed is:

1. A cup feeding apparatus for feeding a cup from one cup feeder selected, according to a beverage to be sold, from a plurality of cup feeders respectively for a plurality of cup sizes, within a cup-type vending machine, said cup feeders for respective cup sizes each storing therein a plurality of corresponding cups stacked on top of one another, said cup feeding apparatus comprising:

a first rotating member which is rotated in a first or second rotation direction based on the rotation of a motor;

a second rotating member provided coaxially with the first rotating member;

a one-way clutch which, when the first rotating member is rotated in the first rotation direction, releases coupling between the first rotating member and the second rotating member, and, when the first rotating member is rotated in the second rotation direction, couples the first rotating member with the second rotating member;

a displacement mechanism for displacing the second rotating member in the axial direction according to the quantity of rotation of the first rotating member in the first rotation direction; and a plurality of operating members which are provided so as to correspond to the plurality of cup feeders and, upon receipt of an external operation command, permit the plurality of cup feeders to perform cup feed operation, said second rotating member being constructed so that the second rotating member is displaced to a position in the axial direction corresponding to a size selected from the plurality of sizes to directly or indirectly engage with one operating member selected from the plurality of operating members, thereby issuing the operation command to the one operating member.

2. The cup feeding apparatus according to claim 1, wherein the second rotating member has a cam which, when the second rotating member is rotated in the second rotation direction, pushes the one operating member in a direction orthogonal to the axial direction while defying the elastic force.

3. The cup feeding apparatus according to claim 1, wherein the plurality of operating members each comprise a plurality of plate members, the number of which corresponds to the number of the plurality of cup feeders, put on top of each other or one another, said plurality of plate members being constructed so that the cam rotated accompanied by the second rotating member pushes one plate member selected by the cam while defying the elastic force.

4. A cup feeding apparatus according to claim 1, wherein, in the first rotating member, the wall surface extending from the uppermost stage to the lowermost stage in the section having a difference in level is constituted by an inclined face.

* * * * *